(12) United States Patent  (10) Patent No.: US 7,742,615 B1
Lopez  (45) Date of Patent: Jun. 22, 2010

(54) WINDSHIELD MOUNTED SPEAKER SYSTEM FOR MOTORCYCLES

(76) Inventor: Randy R. Lopez, 10613 Easy Pl., NW., Albuquerque, NM (US) 87114

( * ) Notice: Subject to any disclaimer, the term of this patent is extended or adjusted under 35 U.S.C. 154(b) by 980 days.

(21) Appl. No.: 11/464,994

(22) Filed: Aug. 16, 2006

Related U.S. Application Data

(60) Provisional application No. 60/708,897, filed on Aug. 16, 2005.

(51) Int. Cl.
*H04R 1/02* (2006.01)
(52) U.S. Cl. ........................ 381/389; 381/386
(58) Field of Classification Search ................. 381/389
See application file for complete search history.

(56) References Cited

U.S. PATENT DOCUMENTS

| | | | |
|---|---|---|---|
| 4,436,350 A | 3/1984 | Jolin | |
| 4,445,228 A | 4/1984 | Bruni | |
| 4,600,208 A | 7/1986 | Morishima | |
| 5,001,779 A | 3/1991 | Eggert et al. | |
| 6,647,121 B2 * | 11/2003 | Stanberry et al. | ............. 381/86 |
| 2003/0142422 A1 | 7/2003 | Spitzer et al. | |
| 2004/0040992 A1 | 3/2004 | Batchelor | |

* cited by examiner

*Primary Examiner*—Brian Ensey
(74) *Attorney, Agent, or Firm*—Jeffrey D. Myers; Peacock Myers, P.C.

(57) ABSTRACT

A method of installing an audio system on a motorcycle having a windshield connected to a remainder of the motorcycle via a plurality of fasteners (and a corresponding audio system and motorcycle) comprising providing one or more audio speakers and via one or more of the fasteners fastening to the remainder of the motorcycle one or more brackets holding the one or more audio speakers.

20 Claims, 7 Drawing Sheets

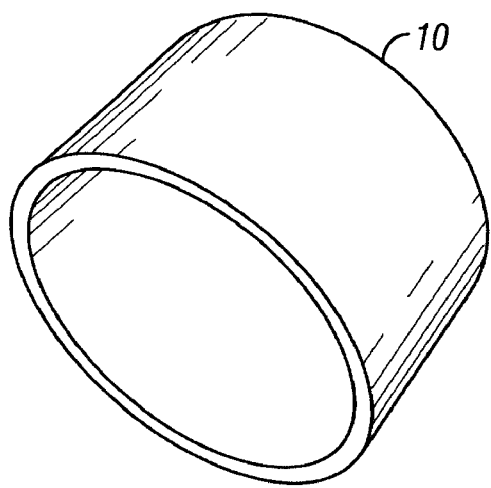 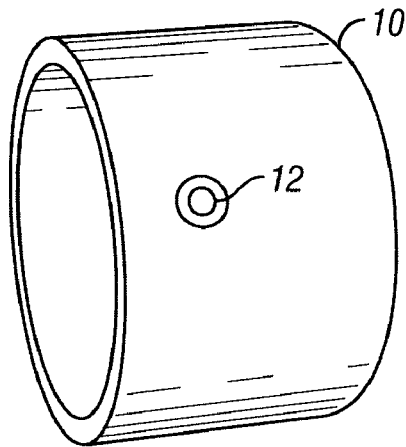
FIG. 1A    FIG. 1B
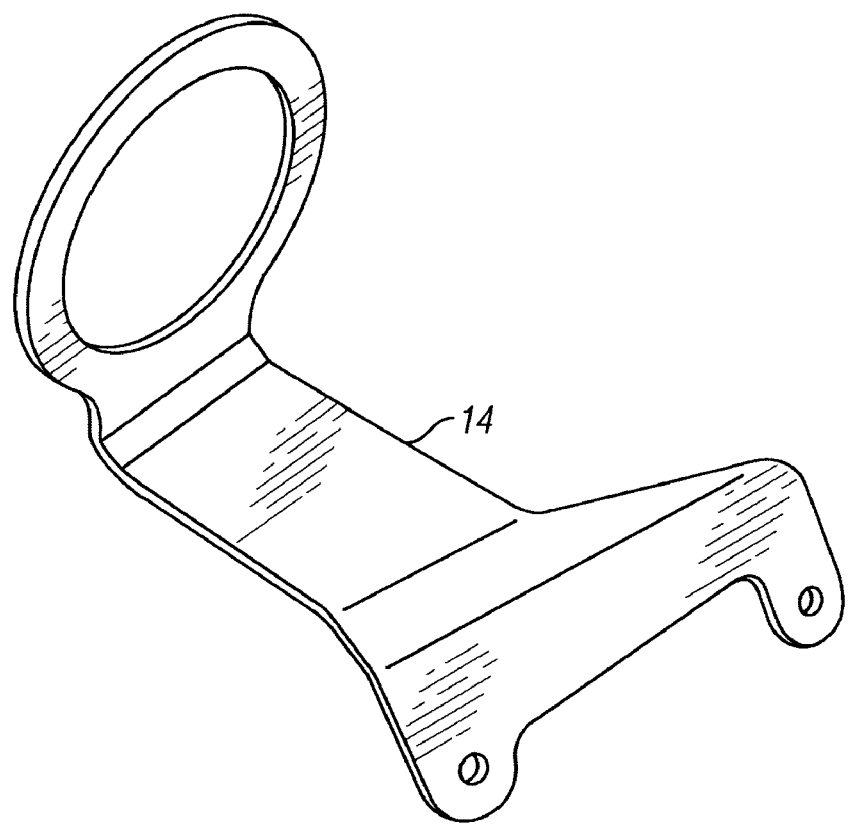
FIG. 2

WINDSHIELD MOUNTED SPEAKER SYSTEM FOR MOTORCYCLES

CROSS-REFERENCE TO RELATED APPLICATIONS

This application claims priority to and the benefit of the filing of U.S. Provisional Patent Application Ser. No. 60/708,897, entitled "Windshield Mounted Speaker System for Motorcycles", filed on Aug. 16, 2005, and the specification and drawings thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to audio systems for motorcycles.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The present invention relates to an improved method of mounting a speaker system to motorcycles of all types, especially motorcycles with windshields. Current motorcycle speaker systems can be grouped into four categories:

1. Fairing mounted: A custom fiberglass windscreen mounted to the front forks of motorcycle. A car stereo is mounted in the center of the fairing and speakers are mounted in cutouts on either side of the fairing. These systems are only available on large factory touring motorcycles and are expensive and not available for the average sized cruiser motorcycle. Examples are U.S. Pat. Nos. 4,915,187, to Nakashima et al.; and 4,600,208, to Morishima.

2. Handlebar mounted: A housing that consists of a car stereo and speakers mounted on either side of the stereo unit. The whole unit mounts to the center of motorcycles handlebars. This handlebar mounted system is bulky and blocks the rider's center view of the road. It also clutters the area around the handlebars and detracts from the overall styling of the motorcycle. An example is U.S. Pat. No. 4,436,350, to Jolin. Another variation consists of a radio receiver mounted between a pair of mirror mounted speakers. This variation mounts to the center of the handlebars with the speakers mounted in the mirrors on either end of the handlebars. These systems utilize very small speakers which when mounted in a mirror type frame, do no produce adequate volume of sound to be heard at highway speeds, and the added weight to the mirror assembly adds unwanted vibrations to the mirrors causing a distorted view to the rider. Examples are U.S. Pat. No. 4,445,228, to Bruni and U.S. Patent Publication No. US 2003/0142422, to Spitzer et al.

3. Gas tank mounted: A portable housing that consists of a car stereo unit and speakers that are easily attached and detached from a motorcycles gas tank. These harnessed based portable systems require that the systems be removed from the motorcycle when it is left unattended while traveling. This requires the operator to transport the system wherever he/she goes. If the system is left mounted to the motorcycle when unattended by the owner, it is susceptible to theft. The system is also bulky and detracts from the overall styling of the motorcycle when mounted. Examples are U.S. Pat. No. 5,001,779, to Eggert et al. and U.S. Patent Publication No. US 2004/0040992, to Batchelor.

4. Windshield mounted: The system mounts to the horizontal and/or vertical supports brackets of the windshield. An example is U.S. Pat. No. 6,647,121, to Stanberry et al. This system is bulky and blocks the rider's center view of the road. The speaker enclosures do not provide sufficient volume to reproduce the bass frequencies of the audio. A low frequency blocker capacitor must be used to minimize low end distortion of the audio at higher volume settings thus limiting the overall frequency range of the system.

The advantages to the present invention include: (1) The bracketed speakers mount on left and right sides of the motorcycle windshield do not block the riders center view of the road; (2) The small footprint of each bracketed speaker assembly is functional and attractively packaged; (3) The volume each speaker enclosure of this system is matched to the parameters of the speaker to accurately reproduce the full audio range of the speaker with minimal distortion; (4) The speaker enclosure system is ideally suited for compact/portable audio devices such as MP3, XM Radio, and CD Players which can be easily mounted the motorcycles handlebars—the audio devices can be easily removed and transported by the operator when the motorcycle is left unattended; (5) The speakers are powered by a compact audio amplifier that can be mounted almost anywhere on the motorcycle; and (6) The chrome/polished aluminum finish of the bracket mounted speakers complements any motorcycle.

BRIEF SUMMARY OF THE INVENTION

The present invention is of a method of installing an audio system on a motorcycle having a windshield connected to a remainder of the motorcycle via a plurality of fasteners (and a corresponding audio system and motorcycle), comprising: providing one or more audio speakers; and via one or more of the fasteners fastening to the remainder of the motorcycle one or more brackets holding the one or more audio speakers. In the preferred embodiment, one protects the one or more audio speakers via one or more housings holding the one or more audio speakers. One or more holes in the one or more housings are provided through which audio signal cabling can pass. An amplifier is connected to the one or more speakers via the audio signal cabling. An audio signal source is connected to the amplifier. Faces of the one or more audio speakers are covered with one or more protective grills. Preferably the audio speakers number two.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 1(a) and (b) show the preferred end cap of the invention;

FIG. 2 shows the preferred mounting bracket of the invention;

DETAILED DESCRIPTION OF THE INVENTION

The present invention is of a system, method, and apparatus for mounting a pair of audio speakers to a motorcycle windshield in such a manner that not only enhances the sound reproduction of music to be played, but also provides an attractive styling variation that complements any motorcycle.

The invention employs a modular speaker mounting system designed specifically for motorcycles. The preferred dual speaker system of the invention comprises a pair of specially formed brackets that house a pair of audio speakers. The dual speaker brackets mount between the motorcycle windshield and the motorcycle handlebars. The dual speaker mounting brackets attach to the existing screws on motorcycle windshield chrome support brackets. The speaker mounting brackets are angled in such a manner as to direct the sound to the rider's ears and are mounted in such a manner that they do not limit the rider's view of the road.

The preferred windshield mounted speaker system is preferably driven by a portable audio device such as a battery operated MP3player, CD Player, or XM Radio tuner system that is mounted on the handlebars. An audio cable carries the signal to a very compact two-channel 50-watt amplifier that can be mounted on the windshield mounting bracket, under the seat, or in the battery compartment. The amplifier provides enough power to allow the music to be heard over road and engine exhaust noise.

The preferred embodiment comprises the following components, discussed in conjunction with the Figures:

Referring to FIGS. 1(a) and (b), each speaker enclosure and bracket assembly 30 preferably comprises an end cap 10, most preferably a 4" PVC end cap that is sanded to accept a vacuum metalized finish that simulates a chrome appearance. The end caps can also be hard chromed or painted. A small hole 12 is drilled or punched into the side of the end cap for the speaker signal cable to the amplifier.

Referring to FIG. 2, each speaker enclosure and bracket assembly is preferably mounted via a bracket 14, most preferably a stainless steel or aluminum bracket that can be chromed, polished, painted, or powder coated, as desired.

Figure 3:
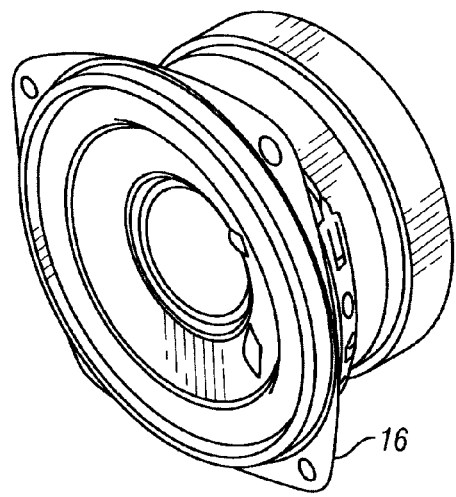
FIG. 3 shows the preferred audio speaker component of the invention.

Referring to FIG. 3, each enclosure preferably houses an audio speaker 16, most preferably a four-ohm audio speaker that is mounted to the speaker bracket.

Figure 4:
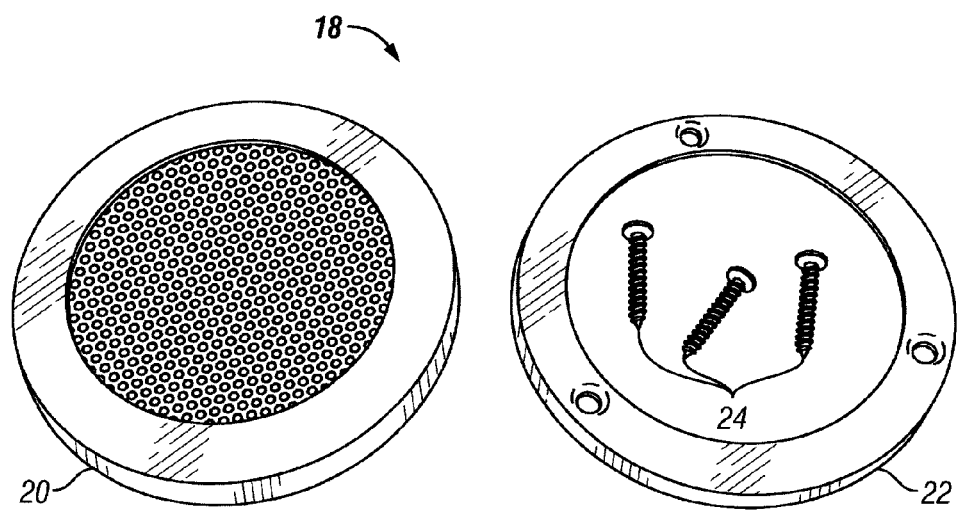
FIG. 4 shows the preferred speaker grille components of the invention.

Referring to FIG. 4, each speaker grille 18 preferably comprises an outer mesh screen trim ring (cover) 20 and an inner securing trim ring 22 secured to the speaker via fasteners 24, such as screws. The grille and trim ring can be chromed, powder coated, or painted, as desired.

Figure 5:
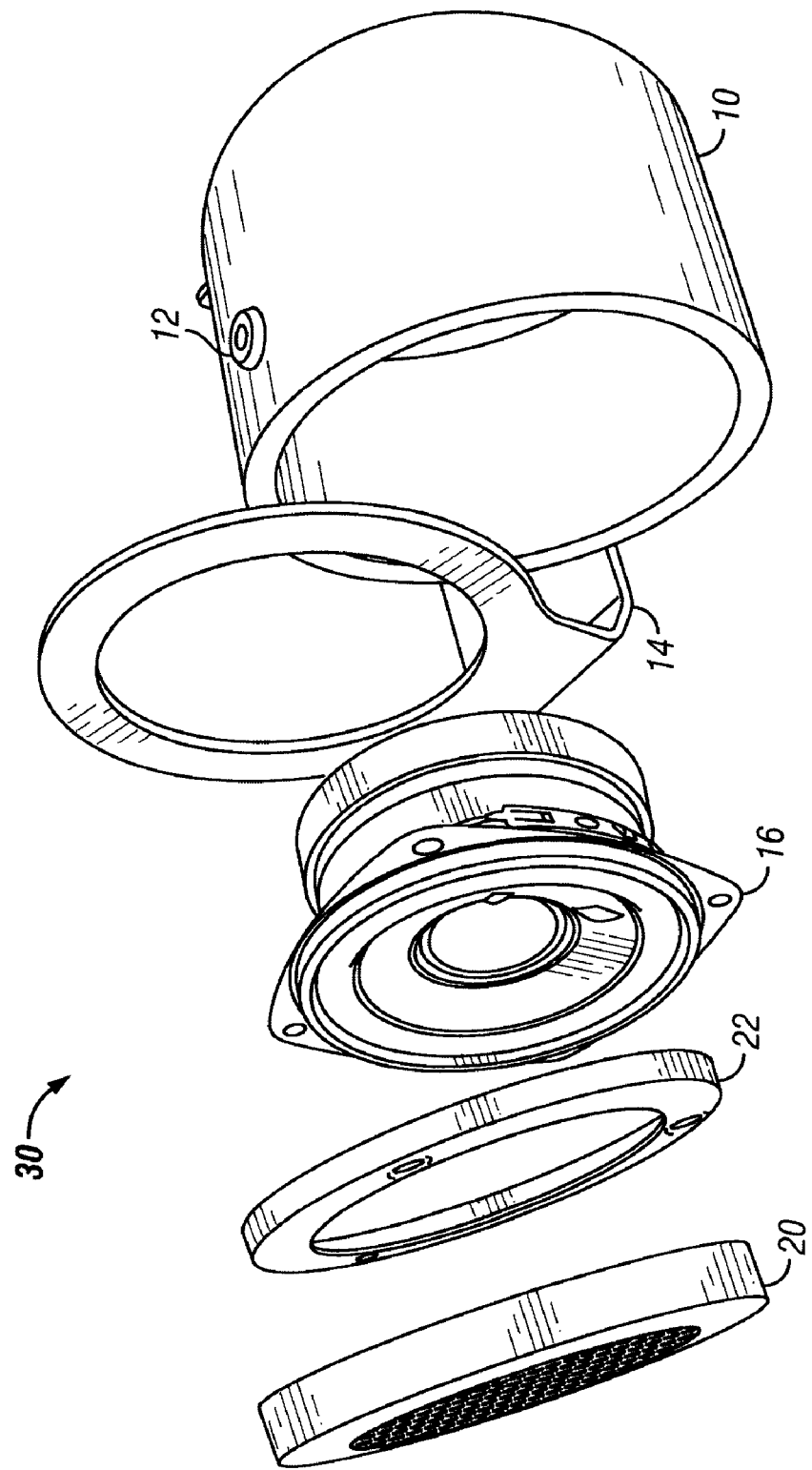
FIG. 5 depicts the preferred mounting order of the components of the invention.

FIG. 5 depicts the preferred mounting order to construct each speaker enclosure and bracket assembly 30. From left to right: Outer mesh screen trim ring (cover) 20, inner speaker grille trim ring 22, speaker 16, speaker mounting bracket 14, and end cap 10.

Figure 6:
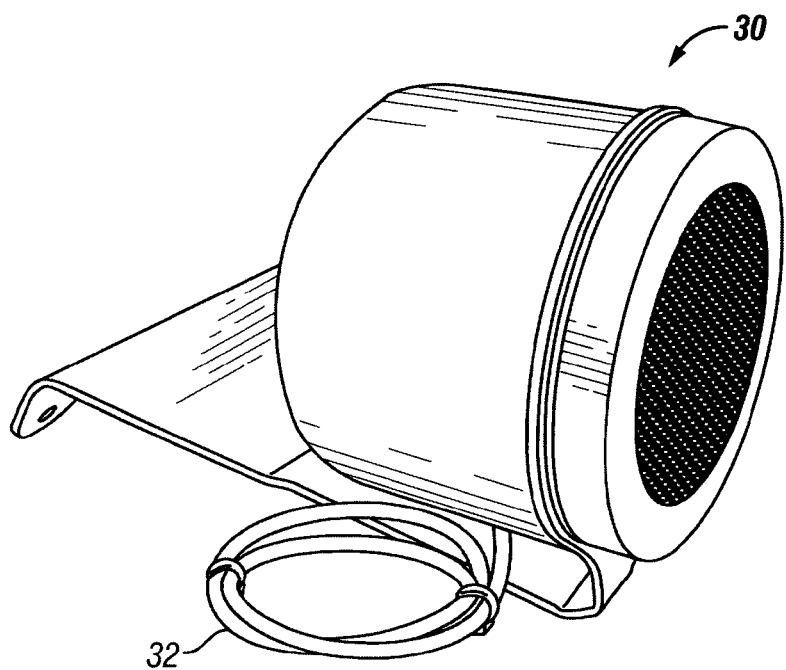
FIG. 6 shows the assembled individual speaker bracket assembly.

FIG. 6 shows the completely assembled individual speaker enclosure and bracket assembly 30 in conjunction with speaker signal cable 32 connecting to the speaker through hole 12 (not shown in this view).

Figure 7:
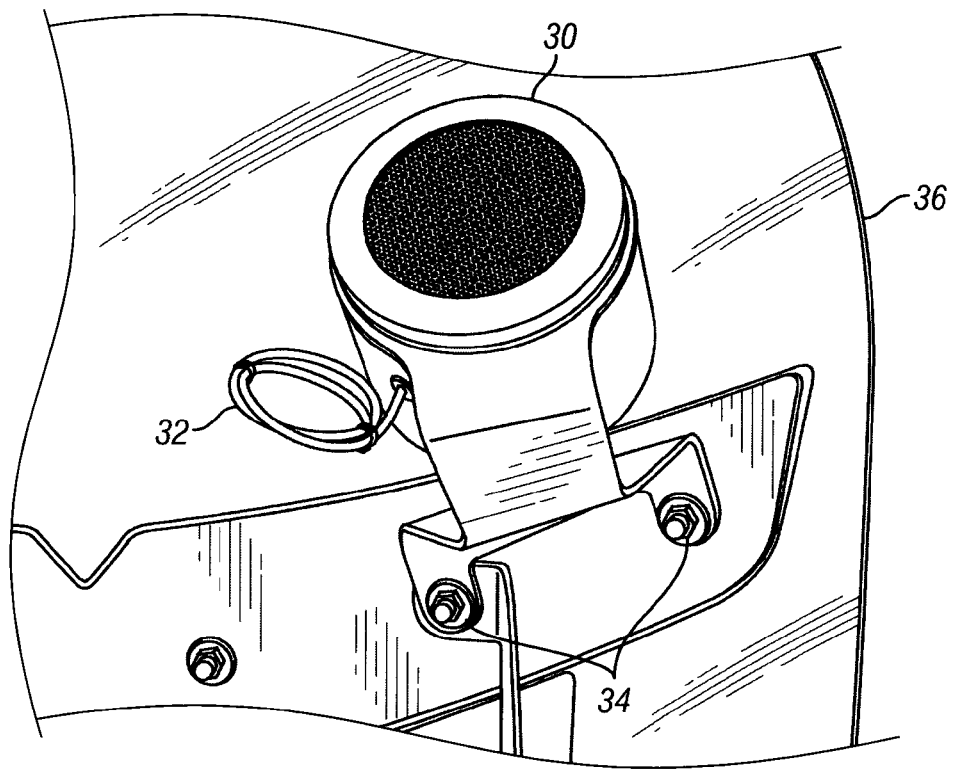
FIG. 7 shows the right speaker bracket mounted to existing bolts on a motorcycle windshield.

FIG. 7 provides a close-up view of the right speaker enclosure and bracket assembly 30 mounted to existing bolts 34 on a motorcycle windshield 36.

Figure 8:
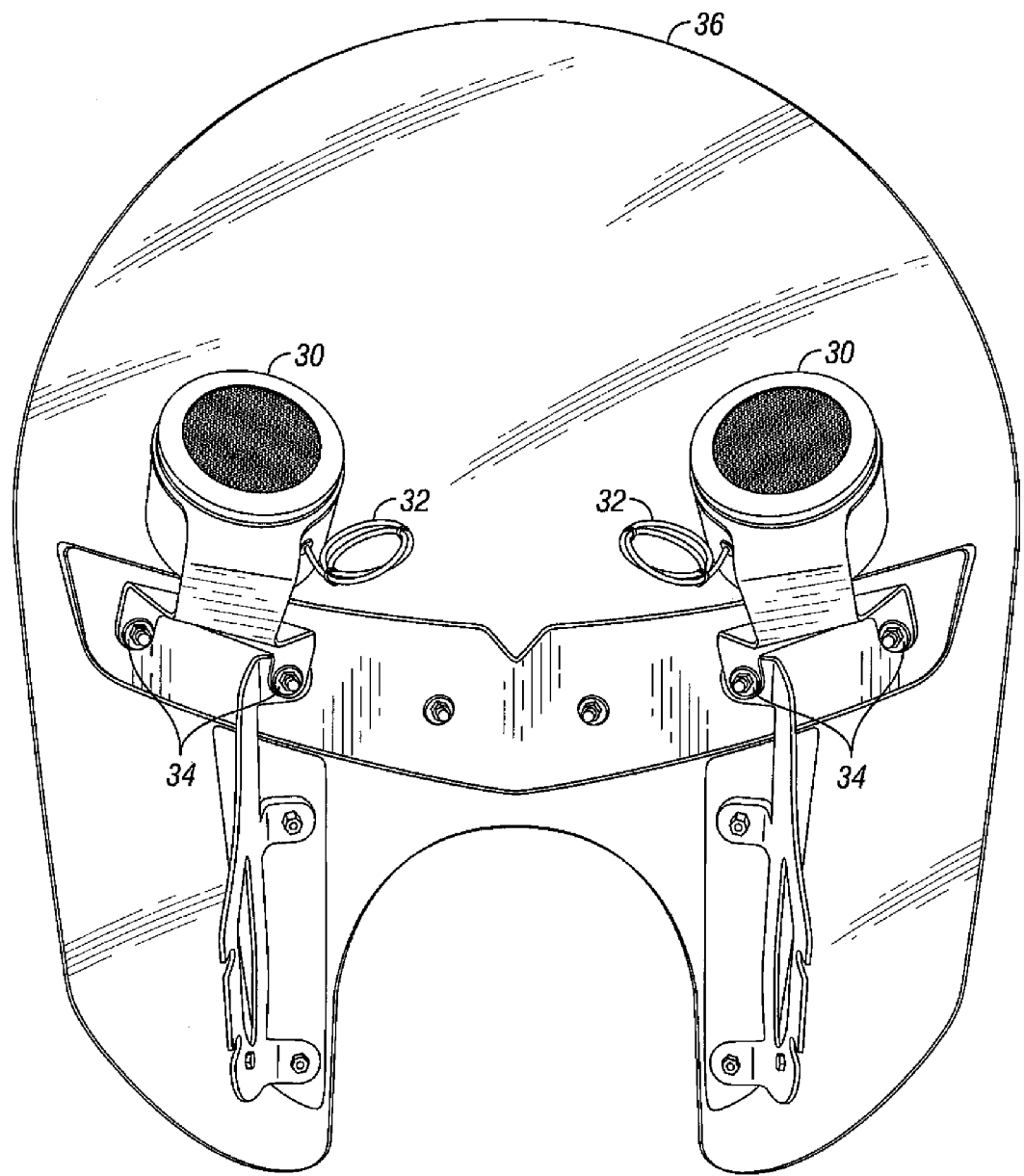
FIG. 8 provides a rear view of a pair of speaker bracket assemblies mounted on a motorcycle windshield.

FIG. 8 provides a rear view of a pair of speaker enclosure and bracket assemblies 30 mounted on a motorcycle windshield 36. mounted on a motorcycle windshield 36.

Figure 9:
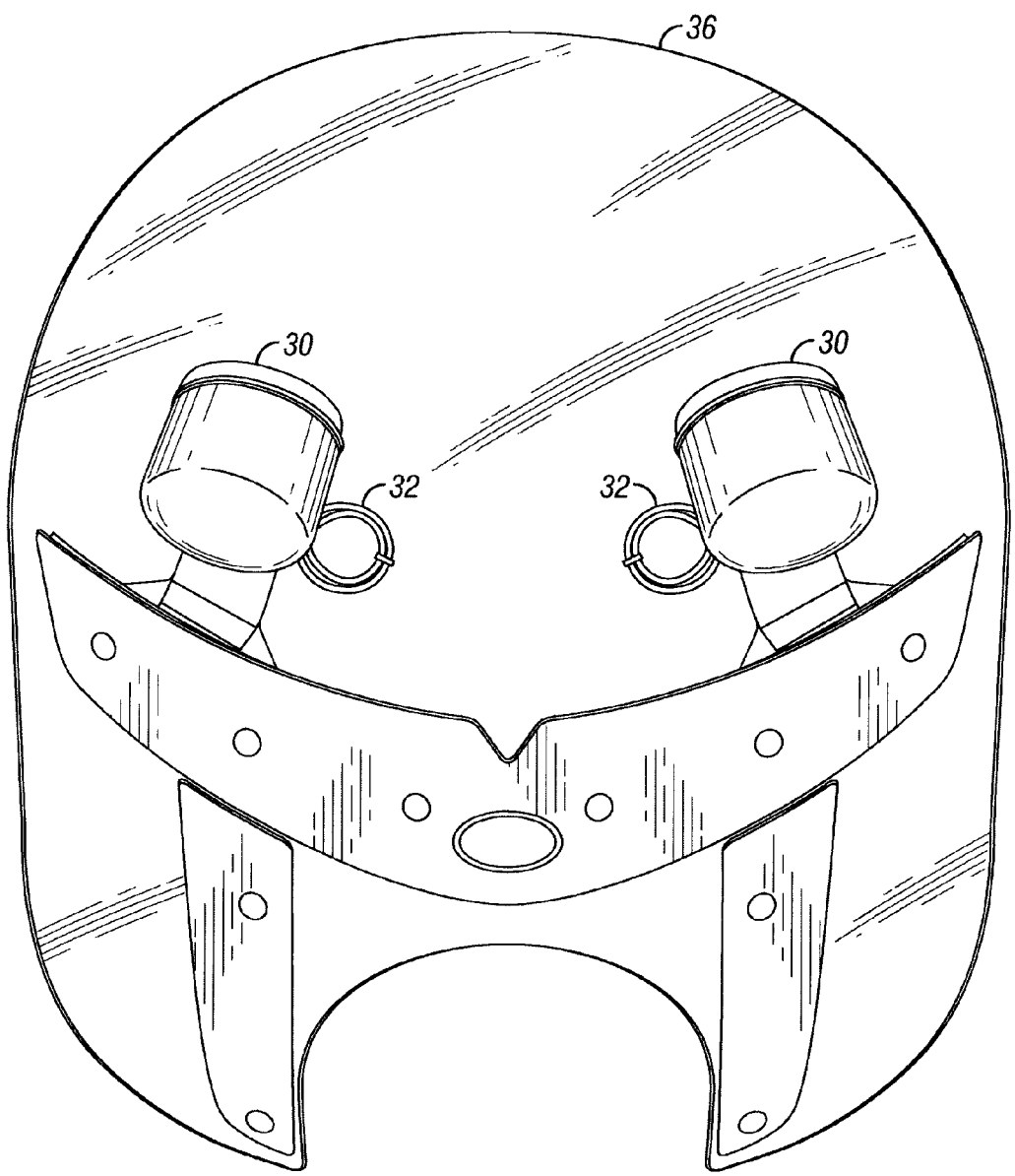
FIG. 9 provides a front view of a pair of speaker bracket assemblies mounted on a motorcycle windshield.

FIG. 9 provides a front view of a pair of speaker enclosure and bracket assemblies 30 mounted on a motorcycle windshield 36.

Figure 10:
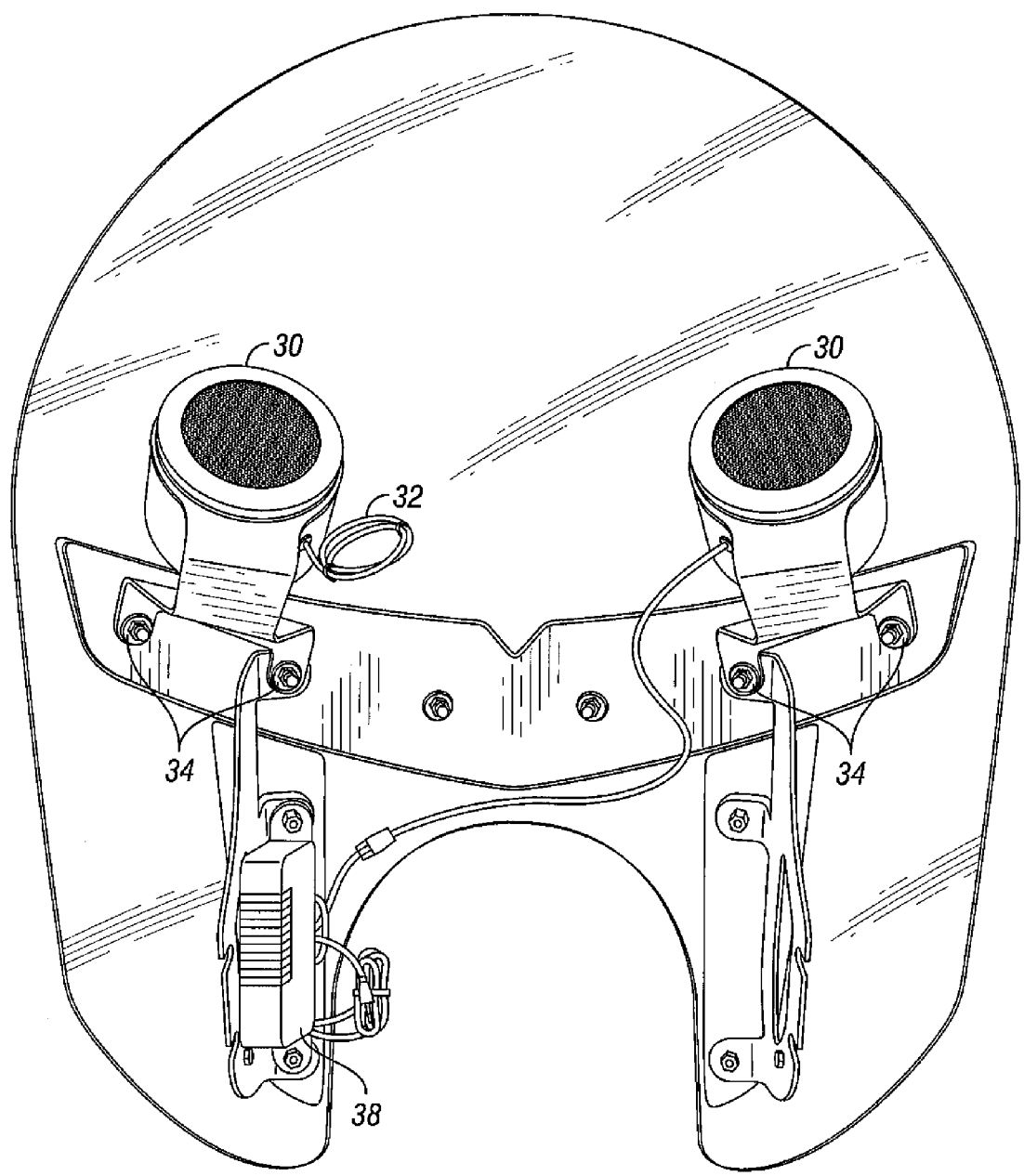
FIG. 10 provides a rear view of the pair of speaker bracket assemblies with an included amplifier.

FIG. 10 provides a rear view of the pair of speaker bracket assemblies with an included amplifier 38.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A motorcycle comprising:
   a windshield connected to a remainder of said motorcycle via a plurality of fasteners;
   one or more audio speakers operably connected to the remainder of said motorcycle via one or more of said fasteners; and
   one or more brackets holding said one or more audio speakers and providing connection of each of said one or more speakers to one or more of said fasteners with no intermediary brackets.

2. The motorcycle of claim 1 additionally comprising one or more housings holding and protecting said one or more audio speakers.

3. The motorcycle of claim 2 additionally comprising one or more holes in said one or more housings through which audio signal cabling can pass.

4. The motorcycle of claim 3 additionally comprising an amplifier connected to said one or more speakers via said audio signal cabling.

5. The motorcycle of claim 4 additionally comprising an audio signal source operably connected to said amplifier.

6. The motorcycle of claim 1 additionally comprising one or more protective grills covering faces of said one or more audio speakers.

7. An audio system for a motorcycle having a windshield connected to a remainder of said motorcycle via a plurality of fasteners, said audio system comprising:
   one or more audio speakers; and
   one or more brackets holding said one or more audio speakers and providing connection of said one or more speakers to one or more of said fasteners with no intermediary brackets.

8. The audio system of claim 7 additionally comprising one or more housings holding and protecting said one or more audio speakers.

9. The audio system of claim 8 additionally comprising one or more holes in said one or more housings through which audio signal cabling can pass.

10. The audio system of claim 9 additionally comprising an amplifier connected to said one or more speakers via said audio signal cabling.

11. The audio system of claim 10 additionally comprising an audio signal source operably connected to said amplifier.

12. The audio system of claim 7 additionally comprising one or more protective grills covering faces of said one or more audio speakers.

13. The audio system of claim 7 wherein said one or more audio speakers consist of two audio speakers.

14. A method of installing an audio system on a motorcycle having a windshield connected to a remainder of the motorcycle via a plurality of fasteners, the method comprising the steps of:
   providing one or more audio speakers; and
   via one or more of the fasteners fastening to the remainder of the motorcycle one or more brackets holding the one or more audio speakers, with no intermediary brackets.

15. The method of claim 14 additionally comprising the step of protecting the one or more audio speakers via one or more housings holding the one or more audio speakers.

16. The method of claim 15 additionally comprising the step of providing one or more holes in the one or more housings through which audio signal cabling can pass.

17. The method of claim 16 additionally comprising the step of connecting an amplifier to the one or more speakers via the audio signal cabling.

18. The method of claim 17 additionally comprising the step of connecting an audio signal source to the amplifier.

19. The method of claim 14 additionally comprising the step of covering faces of the one or more audio speakers with one or more protective grills.

20. The method of claim 14 wherein in the providing step the one or more audio speakers consist of two audio speakers.

* * * * *